(12) United States Patent
Wan

(10) Patent No.: US 10,356,112 B2
(45) Date of Patent: Jul. 16, 2019

(54) METHOD OF MITIGATING COOKIE-INJECTION AND COOKIE-REPLAYING ATTACKS

(71) Applicant: Huawei Technologies Co., Ltd, Longgang, Shenzhen (CN)

(72) Inventor: Tao Wan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 15/066,843

(22) Filed: Mar. 10, 2016

(65) Prior Publication Data
US 2017/0264624 A1 Sep. 14, 2017

(51) Int. Cl.
*H04L 29/06* (2006.01)

(52) U.S. Cl.
CPC ...... *H04L 63/1425* (2013.01); *H04L 63/0272* (2013.01); *H04L 63/1441* (2013.01); *H04L 63/1466* (2013.01)

(58) Field of Classification Search
CPC ............ H04L 63/1425; H04L 63/0272; H04L 63/1466; H04L 63/1441
USPC ........................................................ 726/15
See application file for complete search history.

(56) References Cited

U.S. PATENT DOCUMENTS

| 7,020,658 B1* | 3/2006 | Hill | G06F 17/30067 |
| 7,668,809 B1* | 2/2010 | Kelly | G06F 17/30528 705/5 |
| 8,578,036 B1* | 11/2013 | Holfelder | G06F 17/30864 709/204 |
| 2001/0054020 A1* | 12/2001 | Barth | G06F 17/30867 705/37 |
| 2007/0100962 A1* | 5/2007 | Barth | G06F 17/30867 709/217 |
| 2008/0034413 A1* | 2/2008 | He | H04L 12/4641 726/9 |
| 2008/0034417 A1* | 2/2008 | He | H04L 67/02 726/15 |
| 2009/0193129 A1* | 7/2009 | Agarwal | H04L 63/0281 709/229 |

(Continued)

FOREIGN PATENT DOCUMENTS

| CN | 101977224 A | 2/2011 |
| CN | 102932353 A | 2/2013 |

(Continued)

OTHER PUBLICATIONS

Zheng et al., "Cookies Lack Integrity: Real-World Implications", Proceedings of the 24th USENIX Security Symposium, Aug. 12, 15, 2015, Washington, pp. 707-721.

(Continued)

*Primary Examiner* — Abu S Sholeman
(74) *Attorney, Agent, or Firm* — Norton Rose Fulbright Canada LLP

(57) ABSTRACT

The present disclosure is drawn to systems, methods, and computer-readable media for mitigating cookie-injection and cookie-replaying attacks using a VPN client. The VPN client receives a session request regarding access to a private intranet. In response to the request, the VPN client retrieves cookie deleting criteria, and deletes all cookies which satisfy the cookie deleting criteria. Once all cookies satisfying the cookie deleting criteria are deleted, the VPN client proceeds with the session request.

17 Claims, 10 Drawing Sheets

(56) References Cited

U.S. PATENT DOCUMENTS

| | | | | |
|---|---|---|---|---|
| 2009/0282239 | A1* | 11/2009 | Doleh | G06F 21/335 713/155 |
| 2011/0296036 | A1* | 12/2011 | Canning | H04L 63/0815 709/228 |
| 2012/0096068 | A1* | 4/2012 | Canning | H04L 67/2819 709/203 |
| 2012/0260314 | A1* | 10/2012 | Babula | H04L 63/0272 726/3 |
| 2013/0055384 | A1* | 2/2013 | Shulman | H04L 63/1425 726/22 |
| 2014/0283061 | A1 | 9/2014 | Quinlan et al. | |
| 2014/0298410 | A1* | 10/2014 | Agarwal | H04L 63/0281 726/1 |
| 2016/0330237 | A1* | 11/2016 | Edlabadkar | H04L 63/1475 |

FOREIGN PATENT DOCUMENTS

| | | |
|---|---|---|
| CN | 104052734 A | 9/2014 |
| CN | 105100084 A | 11/2015 |

OTHER PUBLICATIONS

IETF, "HTTP Strict Transport Security (HSTS)", 2012, 46 pages, https://tools.ietf.org/pdf/rfc6797.pdf.

* cited by examiner

METHOD OF MITIGATING COOKIE-INJECTION AND COOKIE-REPLAYING ATTACKS

TECHNICAL FIELD

The present disclosure is generally drawn to virtual private network ("VPN") clients, and more specifically to VPN clients for accessing secure networks.

BACKGROUND

A browser cookie ("cookie") is a small data element sent by a website to a computer for storage. The cookie is typically stored in a web browser used to access the website. When the computer accesses the website, the web browser sends all cookies related to the website back to a server hosting the website. Cookies typically store information about previous interactions between the computer and the website. This information is made available to the website when the cookies are sent to the server. Thus, cookies may be used to preserve an online session, track items in a virtual shopping cart, maintain user settings, and the like.

However, existing same-origin security policies for cookies are loose, and may make it possible to plant unsecured or malicious cookies in a web browser, which may pose a security risk. Cookies are thus a potential attack vector for hackers and other maliciously-intentioned individuals or groups. Many corporate networks have both public-facing services and a private intranet hosted on the same domain, which offers greater convenience for users and administrators, including single sign-on, but is particularly at risk of cookie-based attacks. A first kind of cookie-based attack is a cookie-injection attack, which may allow an attacker to send cookies to private intranet servers without needing access to the private intranet. A second kind of cookie-based attack is a cookie-replaying attack, which may allow an attacker to steal cookies set by websites on the private intranet and replay them to public-facing services hosted on the same domain.

Although part of the security risk can potentially be mitigated by using stricter transmission protocols or by using more complex cookies, these approaches typically require changes to existing systems and codebases. These approaches also may not be supported by all web browsers. Therefore, there is a need for solutions to help mitigate cookie-injection and cookie-replaying attacks without requiring massive changes to existing systems and codebases.

SUMMARY

The present disclosure is drawn to systems, methods, and computer-readable media for mitigating cookie-injection and cookie-replaying attacks using a VPN client. The VPN client receives a session request regarding access to a private intranet. In response to the request, the VPN client retrieves cookie deleting criteria, and deletes all cookies which satisfy the cookie deleting criteria. Once all cookies satisfying the cookie deleting criteria are deleted, the VPN client proceeds with the session request.

In accordance with a broad aspect, there is provided a method receiving a virtual private network (VPN) communication session initialization request; deleting all cookies which satisfy a session initialization cookie deleting criteria; and processing the session initialization request to initiate a session.

In some example embodiments, the method further comprises retrieving the session initialization cookie deleting criteria in response to receiving the session initialization request In some example embodiments, the method further comprises receiving a VPN communication session termination request; deleting all cookies which satisfy a session termination cookie deleting criteria; and processing the session termination request to terminate the session.

In some example embodiments, the method further comprises retrieving the session termination cookie deleting criteria in response to receiving the session termination request.

In some example embodiments, the session initialization cookie deleting criteria and the session termination cookie deleting criteria are the same.

In some example embodiments, the method further comprises receiving a timeout message for the session; deleting all cookies which satisfy a session termination cookie deleting criteria; and terminating the session In some example embodiments, the method further retrieving the session termination cookie deleting criteria in response to receiving the timeout message.

In some example embodiments, the cookie deleting criteria specifies at least one cookie domain, and deleting all cookies which satisfy the cookie deleting criteria comprises deleting all cookies having a domain which matches any of the at least one cookie domain.

In some example embodiments, the cookie deleting criteria specifies at least one cookie domain and at least one cookie subdomain of the at least one cookie domain, and deleting all cookies which satisfy the cookie deleting criteria comprises deleting all cookies having a domain and a subdomain which matches any of the at least one cookie domain and cookie subdomain, respectively.

In some example embodiments, the cookie deleting criteria specifies at least one cookie storage directory, and deleting all cookies which satisfy the cookie deleting criteria comprises deleting all cookies stored in a directory which matches any of the at least one cookie storage directory.

In some example embodiments, the cookie deleting criteria specifies at least one cookie name, and deleting all cookies which satisfy the cookie deleting criteria comprises deleting all cookies having a name which matches any of the at least one cookie name.

In some example embodiments, the cookie deleting criteria specifies a NOT operator and at least one of a cookie domain, a cookie subdomain, a cookie storage directory, and a cookie name, and deleting all cookies which satisfy the cookie deleting criteria comprises deleting all cookies except those having at least one of a domain, a subdomain, a storage directory, and a name which matches any one of the at least one of cookie domain, cookie subdomain, cookie storage directory, and cookie name, respectively.

In some example embodiments, deleting all cookies which satisfy the cookie deleting criteria comprises deleting all cookies except those having a combination of domain, subdomain, storage directory, and name which matches any one combination of the at least one of cookie domain, cookie subdomain, cookie storage directory, and cookie name, respectively.

In some example embodiments, the cookie deleting criteria specifies a null argument, and deleting all cookies which satisfy the cookie deleting criteria comprises deleting no cookies.

In some example embodiments, the cookie deleting criteria comprises a wildcard argument, and processing the session initialization request comprises the browser plugin instructing a web browser associated with the browser plugin to establish the session.

In some example embodiments, the cookie deleting criteria is retrieved over a network.

In some example embodiments, the VPN communication session initialization request is received by a browser plugin, and initializing the VPN communication session comprises the browser plugin instructing a web browser associated with the browser plugin to establish the VPN communication session.

In some example embodiments, deleting all cookies which satisfy the session initialization cookie deleting criteria comprises deleting cookies prior to closing of the web browser In some example embodiments, deleting all cookies which satisfy the cookie deleting criteria comprises the browser plugin instructing the web browser to delete all cookies which satisfy the cookie deleting criteria.

In some example embodiments, all cookies which satisfy the cookie deleting criteria are deleted by the browser plugin without the involvement of the web browser.

In some example embodiments, retrieving the cookie deleting criteria comprises the browser plugin retrieving a configuration file of the web browser.

In some example embodiments, the VPN communication session initialization request is received by a standalone VPN client.

In some example embodiments, the VPN communication session initialization request is received by a standalone VPN client, the standalone VPN client deletes all cookies which satisfy the cookie deleting criteria, and the standalone VPN client initializes the VPN communication session.

In some example embodiments, retrieving the cookie deleting criteria comprises the standalone VPN client retrieving a text file accessible to the standalone VPN client.

In some example embodiments, initializing the VPN communication session comprises providing access to an intranet service specified by the VPN communication session initialization request.

In some example embodiments, initializing the VPN communication session comprises transmitting the VPN communication session initialization request over at least one W-Fi network.

In accordance with a further broad aspect, there is provided a non-transitory medium having stored thereon program instructions executable by a processing unit. The program instructions are executable by the processing unit for receiving a virtual private network ("VPN") communication session initialization request; retrieving cookie deleting criteria in response to receipt of the VPN communication session initialization request; deleting all cookies which satisfy the cookie deleting criteria; and initializing the VPN communication session.

In some example embodiments, the program instructions are further executable by the processing unit for receiving a VPN communication session termination request after initialization of the VPN communication session, deleting all cookies which satisfy the cookie deleting criteria in response to receiving the VPN communication session termination request, and terminating the VPN communication session.

In some example embodiments, the program instructions are further executable by the processing unit for retrieving the cookie deleting criteria in response to receiving the VPN communication session termination request.

In some example embodiments, the program instructions are further executable by the processing unit for receiving a timeout message after initialization of the VPN communication session, deleting all cookies which satisfy the cookie deleting criteria in response to receiving the timeout message, and terminating the VPN communication session.

In some example embodiments, the program instructions are further executable by the processing unit for retrieving the cookie deleting criteria in response to receiving the timeout message.

In some example embodiments, the cookie deleting criteria specifies at least one cookie domain, and deleting all cookies which satisfy the cookie deleting criteria comprises deleting all cookies having a domain which matches any of the at least one cookie domain.

In some example embodiments, the cookie deleting criteria specifies at least one cookie domain and at least one cookie subdomain of the at least one cookie domain, and deleting all cookies which satisfy the cookie deleting criteria comprises deleting all cookies having a domain and a subdomain which matches any of the at least one cookie domain and cookie subdomain, respectively.

In some example embodiments, the cookie deleting criteria specifies at least one cookie storage directory, and deleting all cookies which satisfy the cookie deleting criteria comprises deleting all cookies stored in a directory which matches any of the at least one cookie storage directory.

In some example embodiments, the cookie deleting criteria specifies at least one cookie name, and deleting all cookies which satisfy the cookie deleting criteria comprises deleting all cookies having a name which matches any of the at least one cookie name.

In some example embodiments, the cookie deleting criteria specifies a NOT operator and at least one of a cookie domain, a cookie subdomain, a cookie storage directory, and a cookie name, and deleting all cookies which satisfy the cookie deleting criteria comprises deleting all cookies except those having at least one of a domain, a subdomain, a storage directory, and a name which matches any one of the at least one of cookie domain, cookie subdomain, cookie storage directory, and cookie name, respectively.

In some example embodiments, deleting all cookies which satisfy the cookie deleting criteria comprises deleting all cookies except those having a combination of domain, subdomain, storage directory, and name which matches any one combination of the at least one of cookie domain, cookie subdomain, cookie storage directory, and cookie name, respectively.

In some example embodiments, the cookie deleting criteria specifies a null argument, and deleting all cookies which satisfy the cookie deleting criteria comprises deleting no cookies.

In some example embodiments, the cookie deleting criteria comprises a wildcard argument, and deleting all cookies which satisfy the cookie deleting criteria comprises deleting all cookies.

In some example embodiments, the cookie deleting criteria is retrieved over a network.

In some example embodiments, the program instructions are part of a browser plugin, the VPN communication session initialization request is received by the browser plugin, and initializing the VPN communication session comprises the browser plugin instructing a web browser associated with the browser plugin to establish the VPN communication session.

In some example embodiments, deleting all cookies which satisfy the cookie deleting criteria comprises the browser plugin instructing the web browser to delete all cookies which satisfy the cookie deleting criteria.

In some example embodiments, all cookies which satisfy the cookie deleting criteria are deleted by the browser plugin.

In some example embodiments, retrieving cookie deleting criteria comprises the browser plugin retrieving a configuration file of the web browser, the configuration file being stored on the computer-readable medium.

In some example embodiments, the program instructions are part of a standalone VPN client.

In some example embodiments, retrieving the cookie deleting criteria comprises the standalone VPN client retrieving a text file accessible to the standalone VPN client and stored on the computer-readable medium.

In some example embodiments, the VPN communication session provides access to an intranet service specified by the VPN communication session initialization request.

In some example embodiments, initializing the VPN communication session comprises transmitting the VPN communication session initialization request over at least one W-Fi network.

In accordance with a further broad aspect, there is provided a system. The system comprises a processing unit and a memory. The memory is communicatively coupled to the processing unit and comprises computer-readable program instructions executable by the processing unit for receiving a virtual private network (VPN) communication session initialization request; deleting all cookies which satisfy a session initialization cookie deleting criteria; and processing the session initialization request to initiate the session.

In some example embodiments, the program instructions are further executable by the processing unit for retrieving the session initialization cookie deleting criteria in response to receiving the session initialization request.

In some example embodiments, the program instructions are further executable by the processing unit for receiving a VPN communication session termination request; deleting all cookies which satisfy a session termination cookie deleting criteria; and processing the session termination request to terminate the session.

In some example embodiments, the program instructions are further executable by the processing unit for receiving a VPN communication session termination request after initialization of the VPN communication session, deleting all cookies which satisfy the cookie deleting criteria in response to receiving the VPN communication session termination request, and terminating the VPN communication session.

In some example embodiments, the program instructions are further executable by the processing unit for retrieving the session termination cookie deleting criteria in response to receiving the session termination request.

In some example embodiments, the session initialization cookie deleting criteria and the session termination cookie deleting criteria are the same.

In some example embodiments, the program instructions are further executable by the processing unit for receiving a timeout message for the session; deleting all cookies which satisfy a session termination cookie deleting criteria; and terminating the session.

In some example embodiments, the program instructions are further executable by the processing unit for receiving a timeout message after initialization of the VPN communication session, deleting all cookies which satisfy the cookie deleting criteria in response to receiving the timeout message, and terminating the VPN communication session.

In some example embodiments, the program instructions are further executable by the processing unit for retrieving the session termination cookie deleting criteria in response to receiving the timeout message.

In some example embodiments, the cookie deleting criteria specifies at least one cookie domain, and deleting all cookies which satisfy the cookie deleting criteria comprises deleting all cookies having a domain which matches any of the at least one cookie domain.

In some example embodiments, the cookie deleting criteria specifies at least one cookie domain and at least one cookie subdomain of the at least one cookie domain, and deleting all cookies which satisfy the cookie deleting criteria comprises deleting all cookies having a domain and a subdomain which matches any of the at least one cookie domain and cookie subdomain, respectively.

In some example embodiments, the cookie deleting criteria specifies at least one cookie storage directory, and deleting all cookies which satisfy the cookie deleting criteria comprises deleting all cookies stored in a directory which matches any of the at least one cookie storage directory.

In some example embodiments, the cookie deleting criteria specifies at least one cookie name, and deleting all cookies which satisfy the cookie deleting criteria comprises deleting all cookies having a name which matches any of the at least one cookie name.

In some example embodiments, the cookie deleting criteria specifies a NOT operator and at least one of a cookie domain, a cookie subdomain, a cookie storage directory, and a cookie name, and deleting all cookies which satisfy the cookie deleting criteria comprises deleting all cookies except those having at least one of a domain, a subdomain, a storage directory, and a name which matches any one of the at least one of cookie domain, cookie subdomain, cookie storage directory, and cookie name, respectively.

In some example embodiments, deleting all cookies which satisfy the cookie deleting criteria comprises deleting all cookies except those having a combination of domain, subdomain, storage directory, and name which matches any one combination of the at least one of cookie domain, cookie subdomain, cookie storage directory, and cookie name, respectively.

In some example embodiments, the cookie deleting criteria specifies a null argument, and deleting all cookies which satisfy the cookie deleting criteria comprises deleting no cookies.

In some example embodiments, the cookie deleting criteria comprises a wildcard argument, and deleting all cookies which satisfy the cookie deleting criteria comprises deleting all cookies.

In some example embodiments, the cookie deleting criteria is retrieved over a network.

In some example embodiments, the program instructions are part of a browser plugin, wherein the VPN communication session initialization request is received by the browser plugin, and wherein processing the session initialization request comprises the browser plugin instructing a web browser associated with the browser plugin to establish the session.

In some example embodiments, deleting all cookies which satisfy the session initialization cookie deleting criteria comprises deleting all cookies prior to closing of the web browser In some example embodiments, deleting all cookies which satisfy the cookie deleting criteria comprises the browser plugin instructing the web browser to delete all cookies which satisfy the cookie deleting criteria.

In some example embodiments, all cookies which satisfy the cookie deleting criteria are deleted by the browser plugin.

In some example embodiments, retrieving cookie deleting criteria comprises the browser plugin retrieving a configuration file of the web browser, the configuration file being stored in the memory.

In some example embodiments, the program instructions are part of a standalone VPN client.

In some example embodiments, retrieving the cookie deleting criteria comprises the standalone VPN client retrieving a text file accessible to the standalone VPN client and stored in the memory.

In some example embodiments, the VPN communication session provides access to an intranet service specified by the VPN communication session initialization request.

In some example embodiments, initializing the VPN communication session comprises transmitting the VPN communication session initialization request over at least one W-Fi network.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings which are briefly described hereinbelow.

It will be noted that throughout the appended drawings, like features are identified by like reference numerals.

DETAILED DESCRIPTION

Many corporations and organizations host public-facing web resources and internal web resources on a single domain. Access to the internal web resources is typically restricted to communication devices connected to a private intranet. A virtual private network ("VPN") may also be used to permit a communication device from outside the private intranet to access internal web resources. The VPN may provide a secure connection to the private intranet. However, accessing the private intranet via a VPN from an unsecured or low-security network, for example a public W-Fi network, may allow an attacker to perform cookie-based attacks to gain unauthorized access to the internal web resources. The present disclosure provides a VPN client which mitigates cookie-injection and cookie-replaying attacks by deleting cookies on the communication device, which match cookie deleting criteria, during initialization and termination of a VPN communication session.

Figure 1:
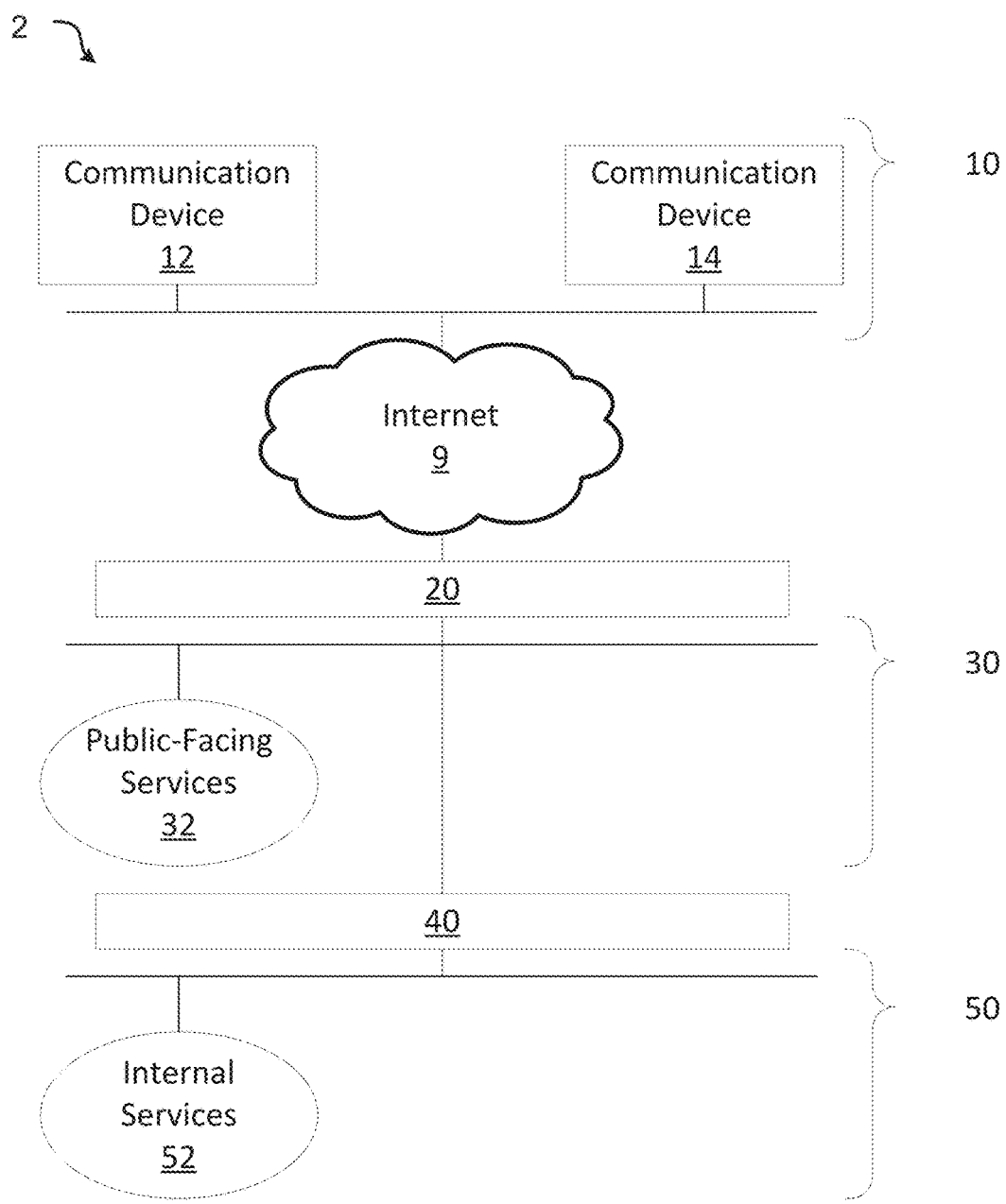
FIG. 1 is a block diagram of an example network susceptible to cookie-based attacks.

With reference to FIG. 1, there is shown a block diagram of an example network 2 susceptible to cookie-based attacks. The network 2 encompasses public network 10, a corporate network 30, and a private intranet 50. The public network 10 may be a Wi-Fi network, a Zigbee™ network, a Bluetooth® network, a LAN network, a WAN network, or any other suitable network. The public network 10 provides access to the Internet 9. The public network 10 may have any number of communication devices connected thereto, including communication device 12 and communication device 14.

The communication devices 12, 14 may be any suitable networked computing device, including a personal computer, workstation, server, portable computer, mobile device, personal digital assistant, laptop, tablet, smart phone, interactive television, video display terminals, gaming consoles, electronic reading device, portable electronic device, wearable electronic device, and the like. The communication devices 12, 14 may be able to access other networks via the public network 10 and the Internet 9, including the corporate network 30 and the private intranet 50.

The corporate network 30 and the private intranet 50 are each protected by a respective firewall 20, 40. The corporate network 30 and the private intranet 50 may belong to a same company or organization, and may be hosted on the same domain. A single sign-on may be valid for both the corporate network 30 and the private intranet 50 using a single set of credentials. The corporate network 30 may host various public-facing services 32, such as email servers, websites, domain name systems ("DNS"), and the like. The private intranet 50 may host various internal services 52, such as intranet websites and internal web applications. Access to the internal services 52 on the private intranet 50 may only be available when connected to the private intranet 50 via an internal network, or via a VPN.

For communication device 12 connected to the public network 10 to access internal services 52 via the Internet 9, the communication device 12 may need to establish a VPN communication session. The communication device 12 may use, for example, a VPN client to establish the VPN communication session. The VPN client may be a standalone VPN client, or may be a plugin or add-on associated with a web browser on the communication device 12.

Figure 2:
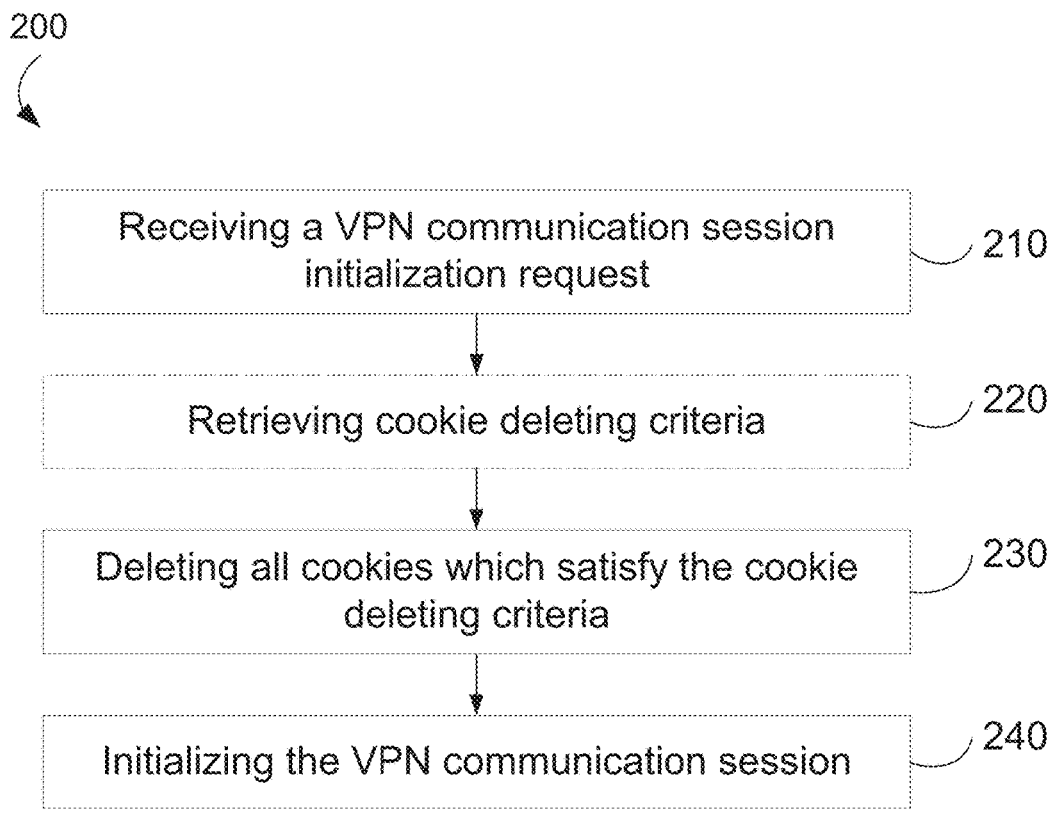
FIG. 2 is a flowchart illustrating a method for mitigating cookie-based attacks when initializing a VPN communication session.

With reference to FIG. 2, the VPN client implements a method 200 to mitigate cookie-injection attacks. At step 210, the VPN client receives a VPN communication session initialization request. The VPN communication session initialization request may include information about the VPN communication session. For example, the VPN communication session initialization request may include a domain name, a domain address, or any suitable network address which indicates the location where the VPN client is to connect. The network address may also be an IP address. The VPN communication session initialization request may also include VPN login credentials. The VPN login credentials may allow the VPN client to establish a connection with the private intranet. The VPN communication session initialization request may also include any other suitable information, including a network subdomain, request priority, and the like.

In embodiments in which the VPN client is a browser plugin, the VPN communication session initialization request may be received via the web browser associated with the browser plugin. In embodiments in which the VPN client is a standalone VPN client, the VPN communication session initialization request may be received via an operating system of the communication device 12, or in any other suitable fashion.

At step 220, the VPN client optionally retrieves cookie deleting criteria. Within the context of the method 200, the cookie deleting criteria are for session initialization. The cookie deleting criteria may be retrieved from any suitable location. For example, the cookie deleting criteria may be retrieved locally, such as from a local storage device present on the communication device 12. The cookie deleting criteria may be stored locally in a configuration or preference file, in a text file, or in any suitable file format. In embodiments in which the VPN client is a browser plugin, the cookie deleting criteria may be stored in a configuration or preference file of the web browser. Alternatively, or in addition, the cookie deleting criteria may be obtained over a network. In some embodiments, the cookie deleting criteria may be obtained over the network periodically and stored locally. In some embodiments, the cookie deleting criteria may be obtained over the network automatically upon connection. Other triggers for retrieving the cookie deleting criteria may also be used. After retrieving the cookie deleting criteria over the network, the VPN client may then store the cookie deleting criteria locally.

The cookie deleting criteria may specify cookie attributes. The VPN client may then delete all cookies stored on the communication device 12 which have attributes matching the cookie attributes specified in the cookie deleting criteria. The cookie deleting criteria may, for example, specify at least one cookie name, such that all cookies having a name which matches any of the at least one cookie name are deleted by the VPN client. The cookie deleting criteria may alternatively, or in addition, specify at least one cookie domain, at least one cookie subdomain, and/or at least one cookie storage directory. The cookie deleting criteria may specify any other suitable cookie attribute, such that all cookies having an attribute which matches any of the at least one cookie attribute are deleted by the VPN client. In some embodiments, the VPN client may only delete cookies having at least two attributes which match the cookie attributes specified in the cookie deleting criteria, or which match at least three of the cookie attributes specified in the cookie deleting criteria, or any other suitable number of attributes matching the cookie attributes specified in the cookie deleting criteria.

The cookie deleting criteria may also specify cookie attributes of cookies that should not be deleted. The cookie deleting criteria may indicate this by using a NOT operator in conjunction with certain cookie attributes. The cookie deleting criteria may, for example, specify deleting all cookies on the communication device 12 except those having at least one attribute which matches at least one cookie attribute specified in the cookie deleting criteria. For example, if the cookie deleting criteria specifies a NOT operator in conjunction with a domain and a storage directory, all cookies except those which have either a matching domain or a matching storage directory may be deleted. Alternatively, the cookie deleting criteria may specify deleting all cookies on the communication device 12 except those for which all attributes match at least one cookie attribute specified in the cookie deleting criteria. For example, if the cookie deleting criteria specifies a NOT operator in conjunction with a domain and a storage directory, all cookies except those which have both a matching domain and a matching storage directory may be deleted.

The cookie deleting criteria may also specify a range of cookie attributes of cookies that should be deleted. The cookie deleting criteria may indicate this by using a wildcard operator in conjunction with certain cookie attributes. For example, if the cookie deleting criteria specifies a wildcard operator in conjunction with a storage directory, all cookies having a matching storage directory, and all cookies in subdirectories of the storage directory may be deleted. The cookie deleting criteria may also specify that all cookies on the communication device 12 are to be deleted, for example by including only the wildcard operator, or in any other suitable fashion.

At step 230, the VPN client deletes all cookies which satisfy the cookie deleting criteria, as described hereinabove. In embodiments in which the VPN client is a browser plugin, the browser plugin may use an API or other software interface to instruct the web browser to delete all cookies which satisfy the cookie deleting criteria. Alternatively, the browser plugin may delete all cookies which satisfy the cookie deleting criteria without the involvement of the web browser. For example, the browser plugin may be provided with write access to the storage device on which the cookies are stored, in order to delete cookies. In embodiments in which the VPN client is a standalone VPN client, the standalone VPN client may delete all cookies which satisfy the cookie deleting criteria via any suitable software interface with the operating system of the communication device 12.

At step 240, the VPN client initializes the VPN communication session. The VPN client may initialize the VPN communication session, for example, by transmitting the VPN communication session initialization request to a VPN gateway server. The VPN gateway server may, for example, be part of the firewall 40. Initializing the VPN communication session may include a handshaking protocol, verification of credentials, challenge-and-answer authentication, or any other suitable security protocols. The VPN gateway server may then establish a VPN communication session with the VPN client and with the communication device 12. The communication device 12 may then access the private intranet 50 and the internal service 52 via the VPN communication session.

By deleting all cookies which match the cookie deleting criteria prior to initializing the VPN communication session, the VPN client prevents any maliciously injected cookies from gaining access to the private intranet 50 and the internal services 52.

Figure 3:
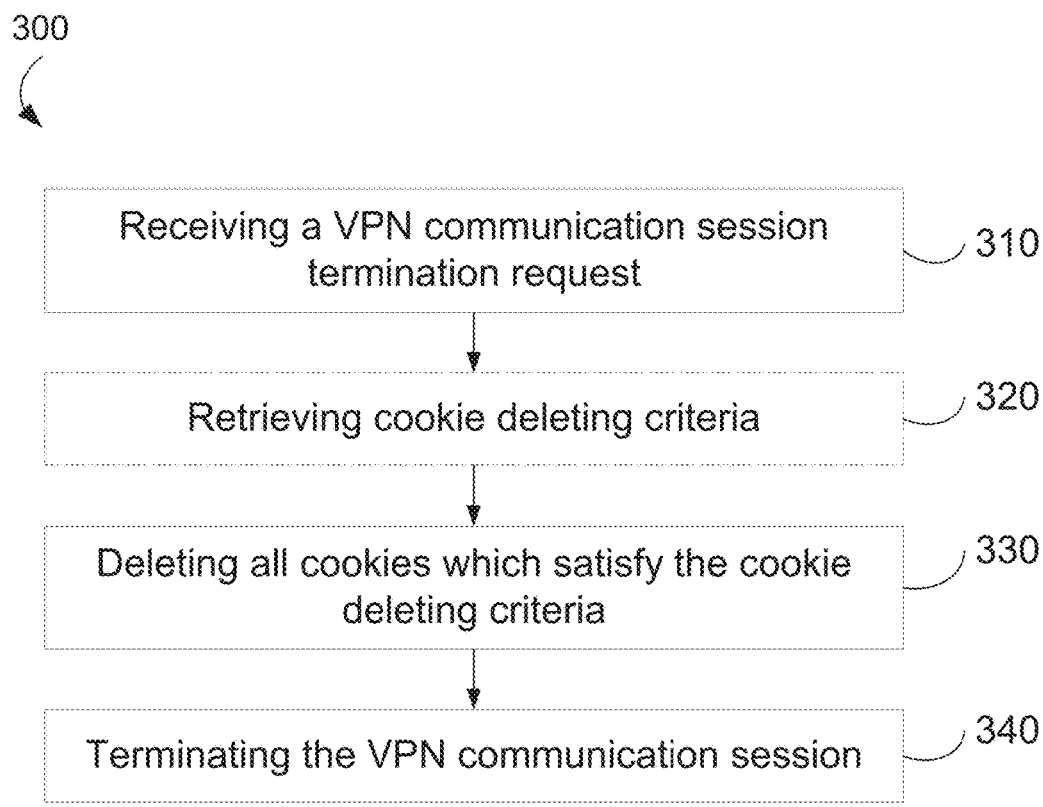
FIG. 3 is a flowchart illustrating a method for mitigating cookie-based attacks when terminating a VPN communication session.

With reference to FIG. 3, the VPN client implements a method 300 to mitigate cookie-replaying attacks. At step 310, the VPN client receives a VPN communication session termination request. The VPN communication session termination request may be a formal termination request. The formal termination request may be received from within the communication device 12, or may be received from external network components, including the VPN gateway server or any suitable network components present on the private intranet 50. Alternatively, the VPN communication session termination request may be an informal request, including a timeout message sent by the VPN gateway server due to a lack of activity of the VPN communication session.

At step 320, the VPN client optionally retrieves the cookie deleting criteria, if necessary. Within the context of the method 300, the cookie deleting criteria are for session termination. In some embodiments, the cookie deleting criteria are the same for both session initialization and session termination. In some embodiments, the cookie deleting criteria for session initialization are kept in memory for the duration of the VPN communication session and used for session termination and therefore, step 320 is omitted. In other embodiments, the cookie deleting criteria for session initialization are not kept in memory. The VPN client optionally retrieves the cookie deleting criteria for session termination at step 320.

At step 330, the VPN client deletes all cookies which satisfy the cookie deleting criteria. Step 330 is implemented similarly to step 230, described above.

At step 340, the VPN client terminates the VPN communication session.

Termination of the VPN communication session may involve handshaking protocols or signoff exchanges, for example with the VPN gateway server.

By deleting all cookies which match the cookie deleting criteria prior to terminating the VPN communication session, the VPN client prevents any cookies with sensitive information received from internal services 52 from being replayed by a malicious attacker.

Figure 4:
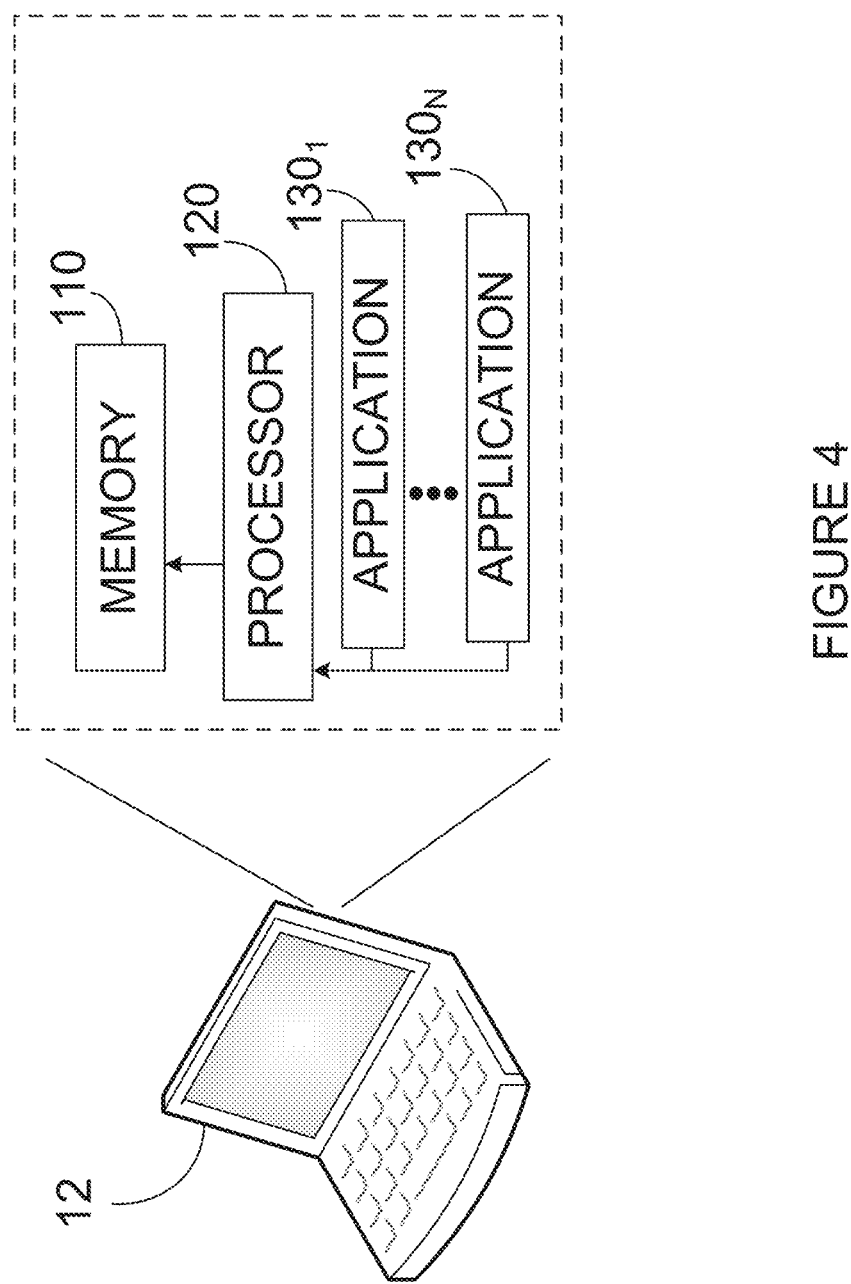
FIG. 4 is a block diagram of an example communication device considered within the context of the present description.

The VPN client may be implemented on the computing device 12 in any suitable manner. With reference to FIG. 4, the computing device 12 includes any suitable type of processor 120, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 12 also include any suitable type of computer memory 110, the computer memory being located internally or externally. For example, the computing device 12 may include random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. The computing device 12 includes a network interface (not pictured) in order to communicate with other components, to access and connect to network resources, and to perform other computing applications by connecting to one or more networks capable of carrying data. The one or more networks may include public network 10, the corporate network 30, the private intranet 50 and any other suitable networks.

The computing device 12 is configured to run or execute any number of applications $130_1$-$130_N$. The applications $130_1$-$130_N$ are stored in the memory 110 of the computing device 12, and are executed on the processor 120. One such application, for example application $130_1$, may be a VPN client application $130_1$.

Figure 5:
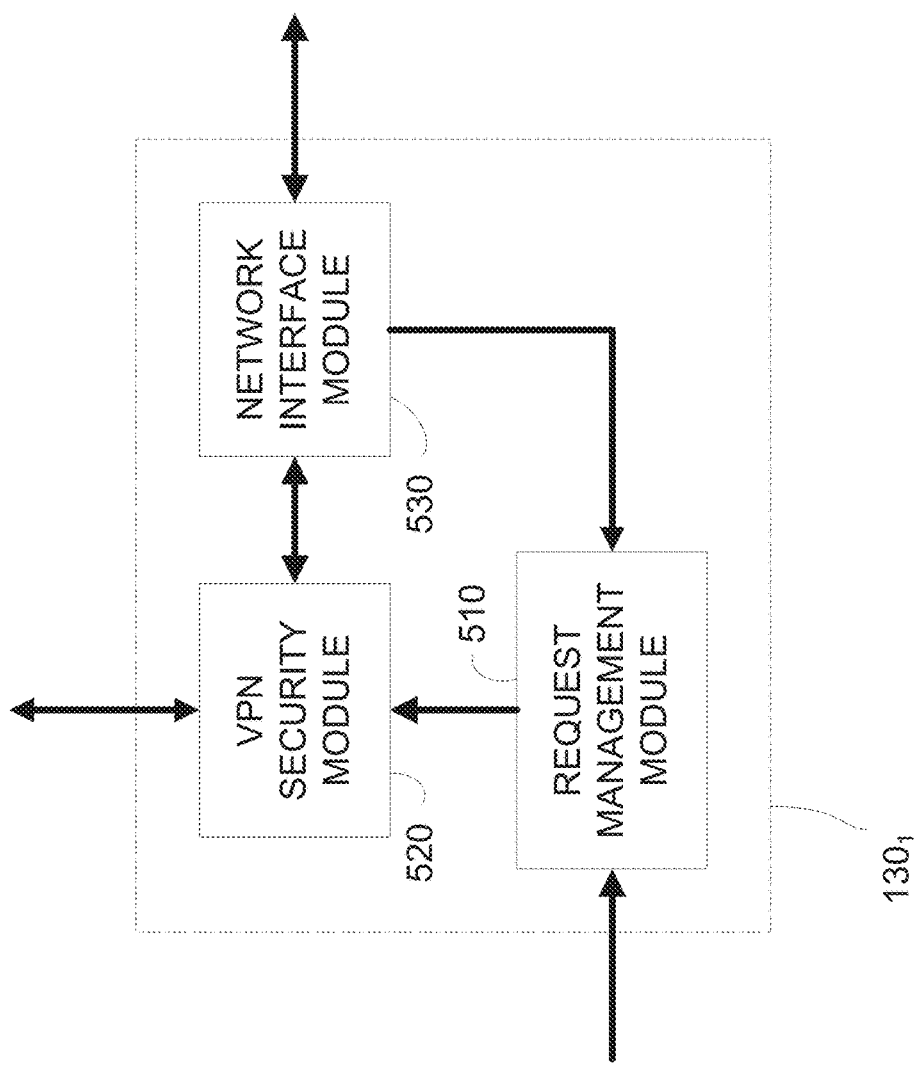
FIG. 5 is a block diagram of an application implementing a VPN client within the context of the present description.

With reference to FIG. 5, the VPN client application $130_1$ comprises a request management module 510, a VPN security module 520, and a network interface module 530. The request management module 510 is configured for receiving VPN communication session initialization requests and VPN communication session termination requests from the processor 120. The request management module 510 is also configured for receiving VPN communication session termination requests and timeout messages from external network components, for example the VPN gateway server. VPN communication session termination request and timeout messages from external network components may be received by the request management module 510 via the network interface module 530, for example.

Upon receiving one of a VPN communication session initialization request, a VPN communication session termination request, and a timeout message, the request management module 510 instructs the VPN security module 520 to begin a cookie deletion process. The VPN security module 520 first retrieves cookie deleting criteria. The cookie deleting criteria may be retrieved from, for example, the memory 110, or may be retrieved over a network, for example via the network interface module 530. The VPN security module may then cause the cookies which satisfy the cookie deleting criteria to be deleted.

Figure 6:
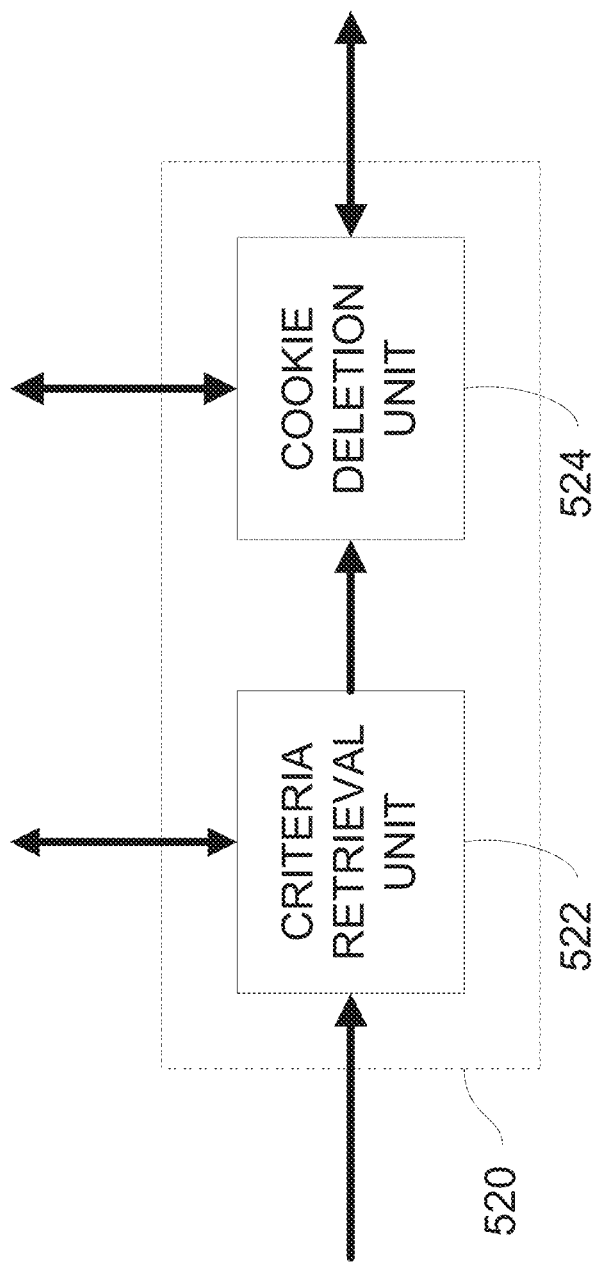
FIG. 6 is a block diagram of a VPN security module of the VPN client implemented by the application illustrated in FIG. 5.

More specifically, and with reference to FIG. 6, the VPN security module 520 comprises a criteria retrieval unit 522 and a cookie deletion unit 524. The criteria retrieval unit 522 receives, from the request management module 510, the instructions to begin the cookie deletion process. The criteria retrieval unit 522 then acquires the cookie deleting criteria. The cookie deleting criteria may be retrieved locally, for example from the memory 110. Alternatively, the cookie deleting criteria may be retrieved over a network, for example via the network interface module 530. If the cookie deleting criteria is retrieved over a network, the criteria retrieval unit 522 may then cause the cookie deleting criteria to be stored locally, for example in the memory 110, if appropriate. The criteria retrieval unit 522 then instructs the cookie deletion unit 524 to delete all cookies which satisfy the cookie deleting criteria.

The cookie deletion unit 524 receives, from the criteria retrieval unit 522, the cookie deleting criteria. The cookie deletion unit 524 identifies those cookies stored on the communication device 12 which satisfy the cookie deleting criteria. The cookie deletion unit 524 then deletes, or causes to be deleted, all cookies which satisfy the cookie deleting criteria. If the VPN client application $130_1$ is a standalone VPN client, the cookie deletion unit 524 may delete all cookies which satisfy the cookie deleting criteria via any suitable software interface with the operating system of the communication device 12. If the VPN client application $130_1$ is a browser plugin, the cookie deletion unit 524 may cause all cookies which satisfy the cookie deleting criteria to be deleted by instructing the web browser to delete all cookies which satisfy the cookie deleting criteria. The cookie deletion unit 524 may instruct the web browser to delete the cookies, for example, via an API or other software interface. Alternatively, if the VPN client application $130_1$ is a browser plugin and has write access to the storage device on which the cookies to be deleted are stored, the cookie deletion unit 524 may delete all cookies which satisfy the cookie deleting criteria via any suitable software interface with the operating system of the communication device 12.

With continued reference to FIG. 5, once all the cookies which satisfy the cookie deleting criteria are deleted, the VPN security module 520, and more specifically the cookie deletion unit 524, receives an indication that the cookie deletion process is completed. The indication that the cookie deletion process is completed may be received from the operating system or the web browser, as appropriate. The VPN security module 520 then indicates to the network interface module 530 that the VPN communication session can be initialized or terminated securely. The network interface module 530 then initializes or terminates, as appropriate, the VPN communication session.

To initialize a VPN communication session, the network interface module 530 transmits the VPN communication session initialization request to, for example, the VPN gateway server. In the event that the VPN communication session is established over a public network, for example a Wi-Fi network, the VPN communication session initialization request may be transmitted over the Wi-Fi network. The network interface module may also perform one or more handshaking protocols, credentials verifications, challenge-and-answer authentications, or any other suitable security protocols. The security protocols may be performed with the VPN gateway server. The VPN gateway server may then establish a VPN communication session with the VPN client application $130_1$ and with the communication device 12.

To terminate the VPN communication session, the network interface module 520 may perform one or more handshaking protocols or signoff exchanges, or any other suitable security protocols. The security protocols may be performed with the VPN gateway server.

Figure 7A:
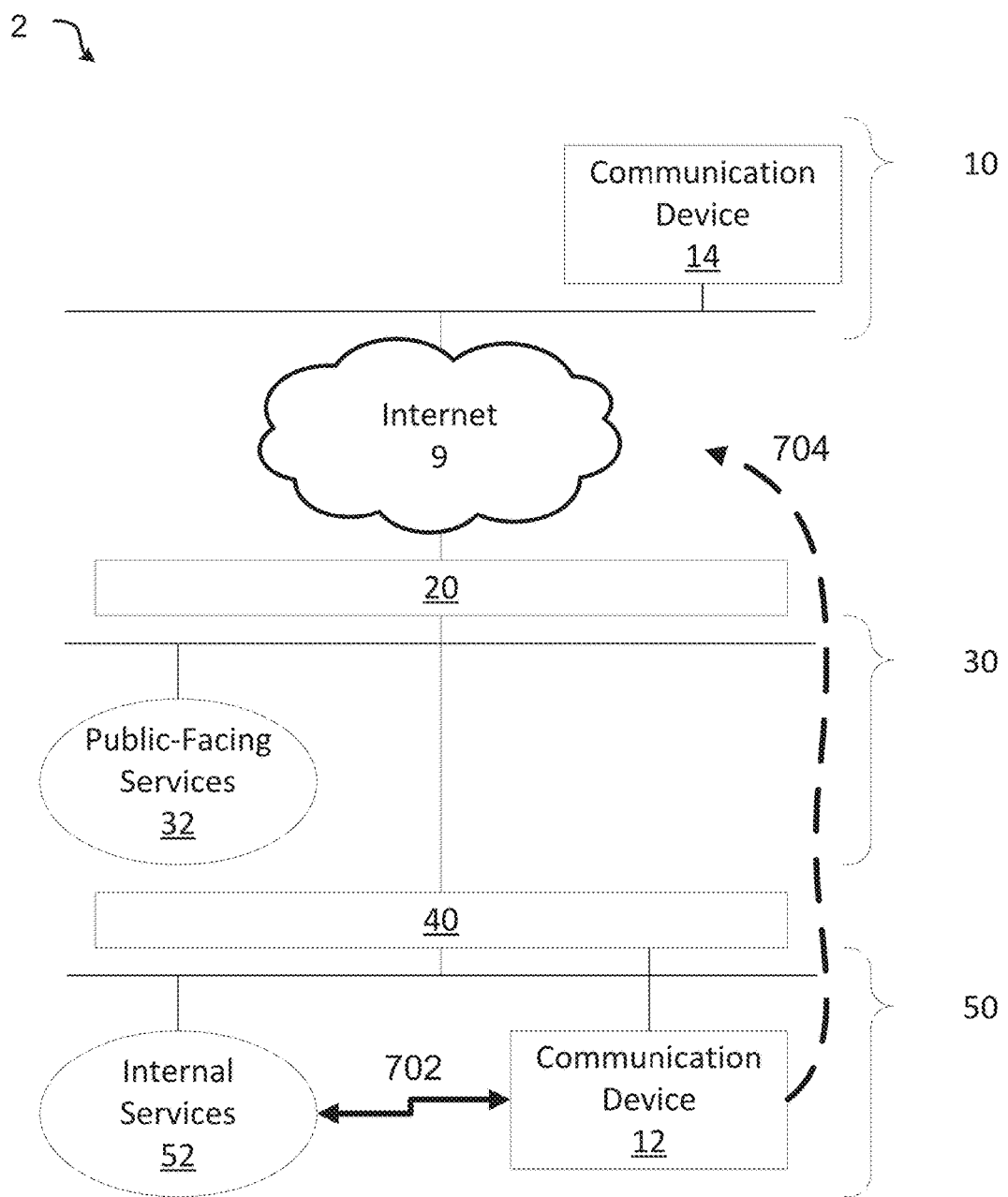
FIGS. 7A-7B are block diagrams of the example network of FIG. 1 illustrating a cookie-replaying attack.

With reference to FIG. 7A, an example malicious cookie-replaying attack in the network 2 will be described. In this example, the communication device 12 is operated by a user who may first be accessing internal services 52 over connection 702. One or more private cookies may be set by the internal services 52 and stored on the communication device 12. Then, the communication device 12 may be moved outside the private network 50, illustrated by arrow 704.

Figure 7B:
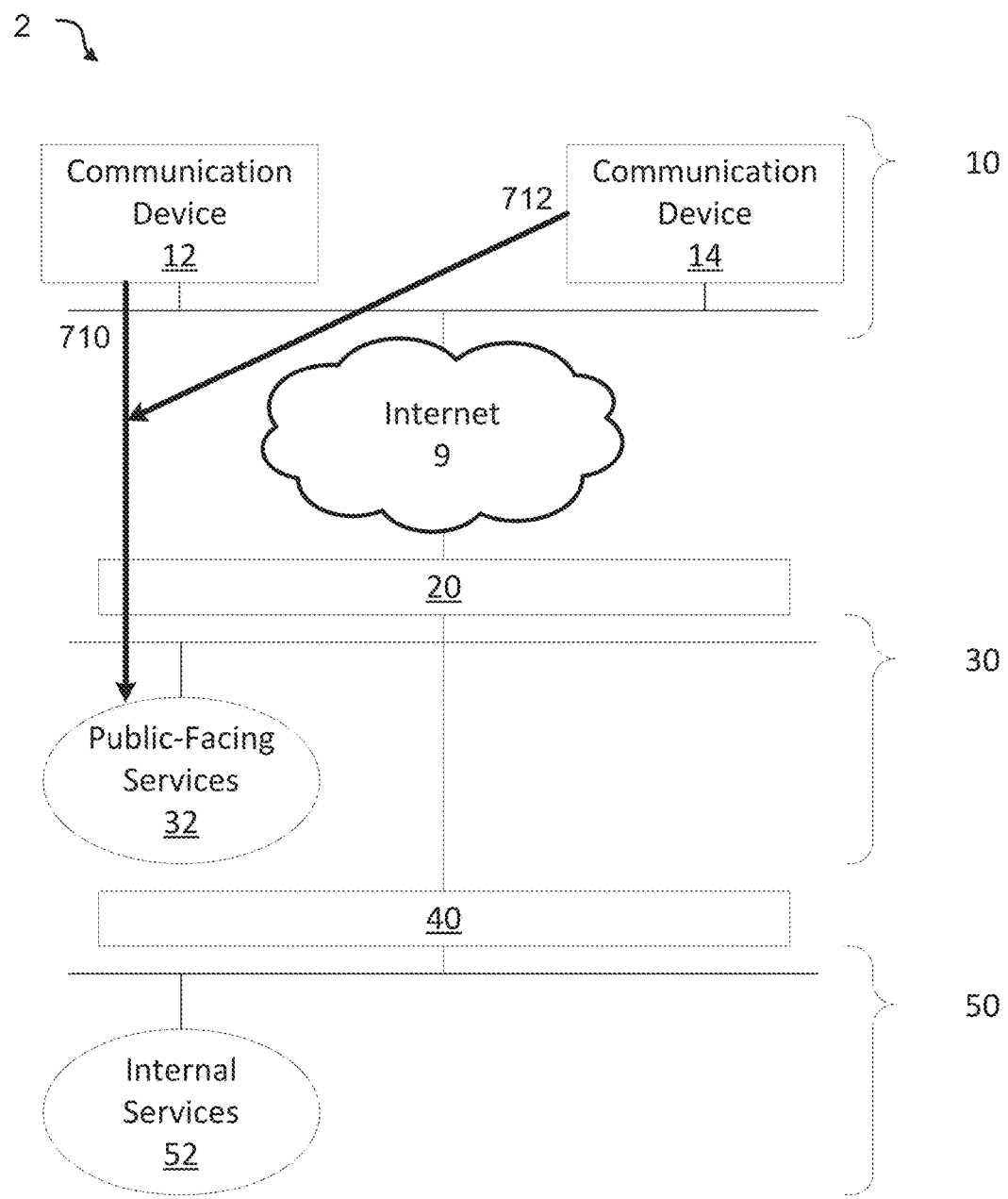

With reference to FIG. 7B, the communication device 12 may then be connected to the public network 10. The communication device 12 may attempt to connect to public-facing services 32 via connection 710. Because the corporate network 30 and the private intranet 50 are hosted on a common domain, the communication device 12 may send all cookies associated with the common domain to the public-facing services 32. The cookies sent by the communication device 12 to the public-facing services 32 may include the private cookies set by the internal services 52. The communication device 14 may be used to intercept the private cookies via connection 712.

Using the VPN client application $130_1$, communication device 12 may initialize a VPN communication session prior to establishing the connection 710. Thus, the VPN client application $130_1$ may implement the method 200 and delete all cookies which satisfy the cookie-deleting criteria. The cookie deleting criteria may be configured to match the private cookies set by the internal services 52. The private cookies may thus be deleted. This prevents the cookie-replaying attack from replaying the private cookies set by the internal services 52 because all cookies set by the internal services 52 are deleted by the VPN client application $130_1$ prior to the connection 710 being established, and there remain no cookies for the connection 712 to intercept.

Figure 8A:
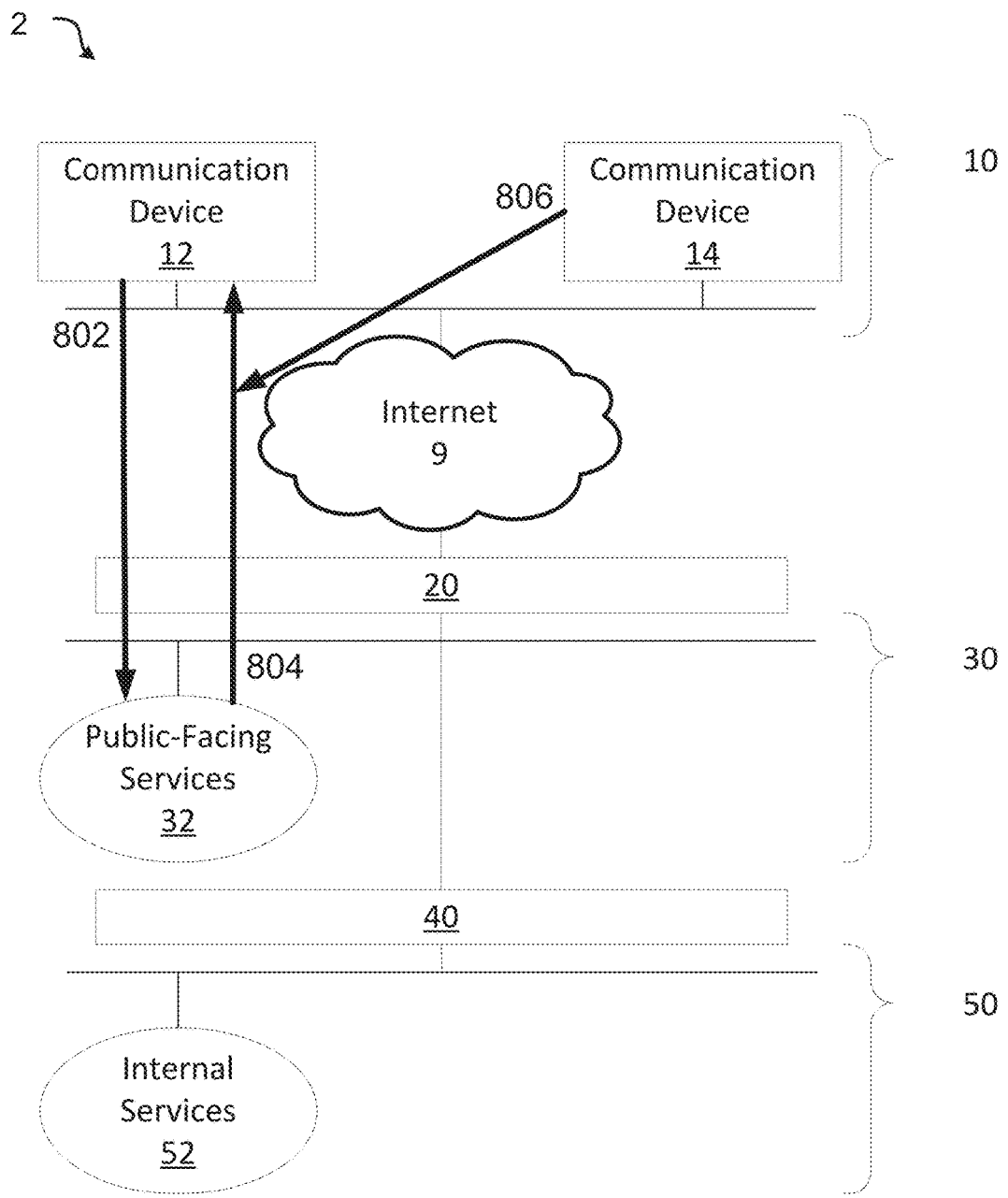
FIGS. 8A-8B are block diagrams of the example network of FIG. 1 illustrating a cookie-injection attack.

With reference to FIG. 8A, an example malicious cookie-injection attack in the network 2 will be described. In this example, the communication device 12 is operated by a user who may access the corporate network 30 and the private intranet 50. For example, the computing device 12 may be a laptop computer which may be used both on the private intranet 50 and over public networks 10. The communication device 14 is operated by an attacker who wishes to perform a cookie-based attack on the private intranet 50. The public network 10 may be any suitable public network, for example a public Wi-Fi network.

The communication device 12 may access one or more public-facing services 32 via connection 802-804. The connection 802-804 may be routed over the public network 10, through the Internet 9 and the firewall 20, to the corporate network 30, and vice-versa. The connection 802-804 may allow bidirectional communication between the communication device 12 and the public-facing services 32. The communication device 14 may be used to inject one or more malicious cookies via the communication 806. The one or more malicious cookies may be spoofed to appear to be valid cookies, but may in fact contain malicious code.

Figure 8B:
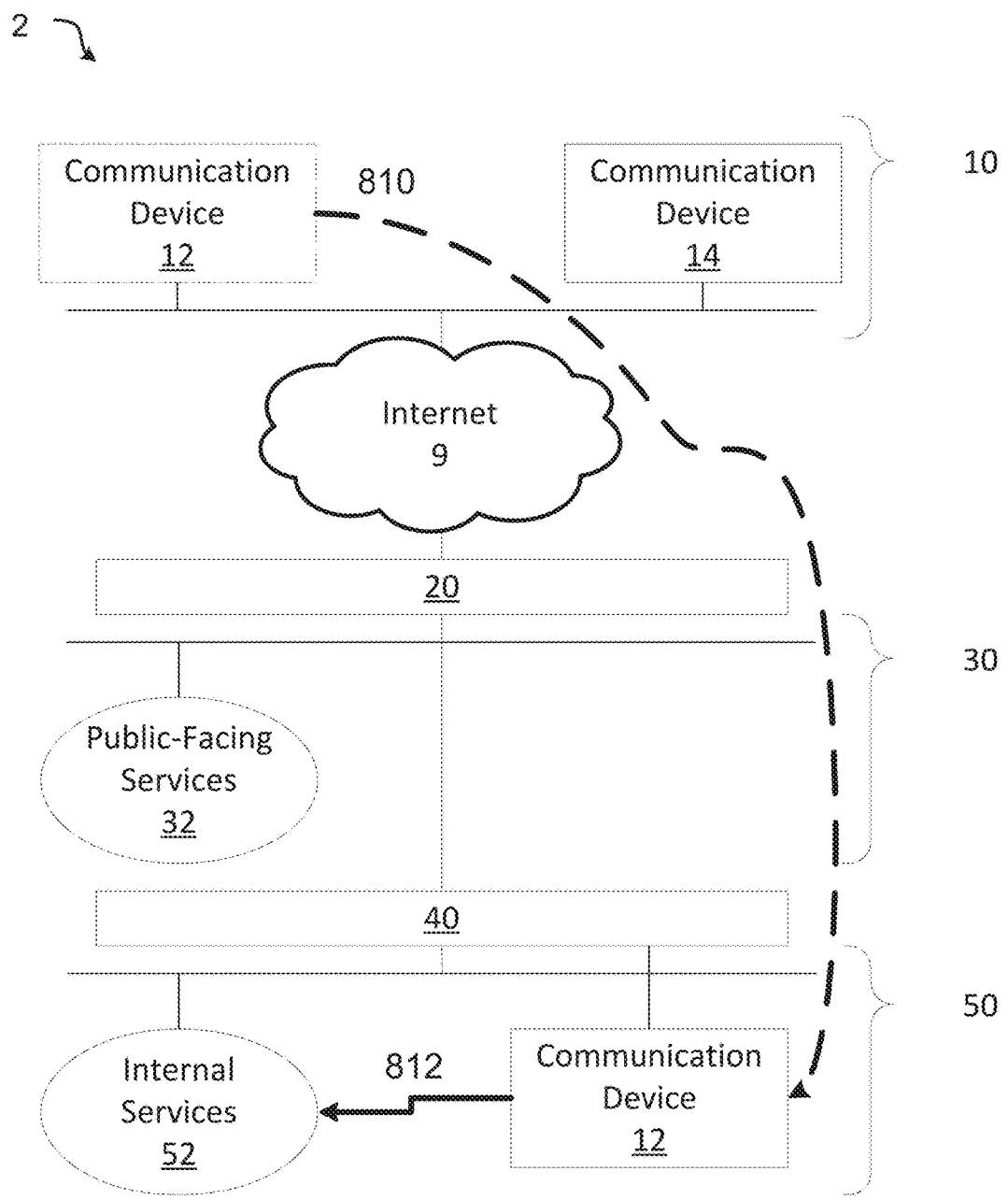

With reference to FIG. 8B, the computing device 12 may be disconnected from the public network 10 and connected to the private network 50, illustrated by arrow 810. For example, the communication device 12 may have been connected to a public VVI-Fi network of a coffee shop, and moved to an office where the communication device 12 may be connected to the private intranet 50. Then, when the communication device accesses internal services 52 via the private intranet 50 over connection 812, the one or more malicious cookies may be injected into the private intranet 50.

Using the VPN client application $130_1$, the communication device 12 may initialize a VPN communication session prior to establishing the connection 802-804. Disconnecting the communication device 12 from the public network 10 may terminate the VPN communication session. Thus, the VPN client application $130_1$ may implement the method 300 and delete all cookies which satisfy the cookie deleting criteria. The cookie deleting criteria may be configured to match malicious cookies injected by the communication device 14 via the connection 802-804. The malicious cookies may thus be deleted. This prevents the cookie-injection attack from succeeding at injecting malicious cookies into the private intranet 50.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present VPN client may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A computer-implemented method, comprising:
receiving, by a virtual private network (VPN) client application running on a computing device, a VPN communication session initialization request, the VPN client application is a browser plugin that receives the VPN communication session initialization request;
in response to receiving, by the VPN client application running on the computing device, the VPN communication session initialization request and prior to initiating a VPN communication session, deleting, by the VPN client application running on the computing device, cookies stored on the computing device which have attributes which satisfy cookie attributes specified in a session initialization cookie deleting criteria prior to closing of a web browser associated with the browser plugin; and
processing, by the VPN client application running on the computing device, the VPN communication session initialization request to initiate the VPN communication session after deleting the cookies which have attributes which satisfy cookie attributes specified in the session initialization cookie deleting criteria, the browser plugin instructing the web browser to establish the VPN communication session.

2. The method of claim 1, further comprising retrieving, by the VPN client application running on the computing device, the session initialization cookie deleting criteria in response to receiving the VPN communication session initialization request.

3. The method of claim 1, further comprising:
receiving, by the VPN client application running on the computing device, a VPN communication session termination request;
deleting, by the VPN client application running on the computing device, all cookies which have attributes which satisfy cookie attributes specified in a session termination cookie deleting criteria; and
processing, by the VPN client application running on the computing device, the VPN communication session termination request to terminate the VPN communication session.

4. The method of claim 3, further comprising retrieving, by the VPN client application running on the computing device, the session termination cookie deleting criteria in response to receiving the VPN communication session termination request.

5. The method of claim 3, wherein the session initialization cookie deleting criteria and the session termination cookie deleting criteria are the same.

6. The method of claim 1, further comprising:
receiving, by the VPN client application running on the computing device, a timeout message for the VPN communication session;
deleting, by the VPN client application running on the computing device, all cookies which satisfy a session termination cookie deleting criteria; and
terminating, by the VPN client application running on the computing device, the VPN communication session.

7. The method of claim 6, further comprising retrieving, by the VPN client application running on the computing device, the session termination cookie deleting criteria in response to receiving the timeout message.

8. The method of claim 1, wherein the cookie attributes specified in the session initialization cookie deleting criteria comprises at least one cookie domain, wherein deleting cookies having attributes which satisfy the cookie attributes specified in the session initialization cookie deleting criteria comprises deleting cookies having a domain which matches any of the at least one cookie domain.

9. The method of claim 1, wherein the session initialization cookie deleting criteria is retrieved over a network.

10. A system, comprising:
a processing unit; and
a memory, communicatively coupled to the processing unit and comprising computer-readable program instructions executable by the processing unit for:
receiving, by a virtual private network (VPN) client application running on the system, a VPN communication session initialization request, the VPN client application is a browser plugin that receives the VPN communication session initialization request;
in response to receiving, by the VPN client application running on the system, the VPN communication session initialization request and prior to initiating a VPN communication session, deleting, by the VPN client application running on the system, cookies stored on the system which have attributes which satisfy cookie attributes specified in a session initialization cookie deleting criteria prior to closing of a web browser associated with the browser plugin; and
processing, by the VPN client application running on the system, the VPN communication session initialization request to initiate the VPN communication session after deleting the cookies which have attributes which satisfy cookie attributes specified in the session initialization cookie deleting criteria, the browser plugin instructing the web browser to establish the VPN communication session.

11. The system of claim 10, wherein the program instructions are further executable by the processing unit for retrieving, by the VPN client application running on the system, the session initialization cookie deleting criteria in response to receiving the VPN communication session initialization request.

12. The system of claim 10, wherein the program instructions are further executable by the processing unit for:
receiving, by the VPN client application running on the system, a VPN communication session termination request;
deleting, by the VPN client application running on the system, all cookies which satisfy a session termination cookie deleting criteria; and
processing, by the VPN client application running on the system, the VPN communication session termination request to terminate the VPN communication session.

13. The system of claim 12, wherein the program instructions are further executable by the processing unit for retrieving, by the VPN client application running on the system, the session termination cookie deleting criteria in response to receiving the VPN communication session termination request.

14. The system of claim 12, wherein the session initialization cookie deleting criteria and the session termination cookie deleting criteria are the same.

15. The system of claim 10, wherein the program instructions are further executable by the processing unit for:

receiving, by the VPN client application running on the system, a timeout message for the VPN communication session;

deleting, by the VPN client application running on the system, all cookies which satisfy a session termination cookie deleting criteria; and terminating, by the VPN application client running on the system, the VPN communication session.

16. The system of claim 15, wherein the program instructions are further executable by the processing unit for retrieving, by the VPN client application running on the system, the session termination cookie deleting criteria in response to receiving the timeout message.

17. The system of claim 10, wherein the session initialization cookie deleting criteria is retrieved over a network.

\* \* \* \* \*